(12) United States Patent
Tiegs et al.

(10) Patent No.: US 6,197,243 B1
(45) Date of Patent: Mar. 6, 2001

(54) HEAT DISTRIBUTION CERAMIC PROCESSING METHOD

(75) Inventors: Terry N. Tiegs, Lenoir City; James O. Kiggans, Jr., Oak Ridge, both of TN (US)

(73) Assignee: UT Battelle, LLC, Oak Ridge, TN (US)

(*) Notice: Subject to any disclaimer, the term of this patent is extended or adjusted under 35 U.S.C. 154(b) by 0 days.

(21) Appl. No.: 08/764,902

(22) Filed: Mar. 23, 1995

Related U.S. Application Data

(63) Continuation of application No. 08/046,876, filed on Apr. 16, 1993, now abandoned.

(51) Int. Cl.[7] .............................. C04B 33/32; C04B 35/65
(52) U.S. Cl. ........................ 264/432; 264/434; 264/647; 219/759
(58) Field of Search ................................. 264/432, 434, 264/647

(56) References Cited

U.S. PATENT DOCUMENTS

| | | |
|---|---|---|
| 3,585,258 | 6/1971 | Levinson . |
| 3,701,872 | 10/1972 | Levinson . |
| 4,147,911 | 4/1979 | Nishitani . |
| 4,307,277 | 12/1981 | Maeda et al. . |
| 4,404,292 | 9/1983 | Daviot . |
| 4,521,358 | 6/1985 | Miura et al. . |
| 4,810,846 | 3/1989 | Holcombe et al. . |
| 4,900,526 | 2/1990 | Matsuda et al. . |
| 4,963,709 | 10/1990 | Kimrey, Jr. . |
| 5,010,220 | 4/1991 | Apte et al. . |
| 5,013,694 | 5/1991 | Holcombe et al. . |
| 5,072,087 | 12/1991 | Apte et al. . |
| 5,154,779 | 10/1992 | Holcombe et al. . |
| 5,164,130 | * 11/1992 | Holcombe .............................. 264/26 |
| 5,202,541 | * 4/1993 | Patterson ............................... 264/26 |
| 5,432,325 | * 7/1995 | Katz et al. ............................ 219/759 |

OTHER PUBLICATIONS

The American Ceramic Society Inc., 91st Annual Meeting, Abstracts, Apr. 23—Thursday, Apr. 27, 1989.
Cressie E. Holcombe, "New Microwave Coupler Material", Oak Ridge Y–12 Plant, Oak Ridge, TN.
William H. Suttan, "Microwave Processing of Ceramic Materials", United Technologies Research Center, East Hartford, CT, vol. 68, No. 2, 1989.

* cited by examiner

Primary Examiner—James Derrington
(74) Attorney, Agent, or Firm—Kilpatrick Stockton LLP

(57) ABSTRACT

A multi-layered heat distributor system is provided for use in a microwave process. The multi-layered heat distributors includes a first inner layer of a high thermal conductivity heat distributor material, a middle insulating layer and an optional third insulating outer layer. The multi-layered heat distributor system is placed around the ceramic composition or article to be processed and located in a microwave heating system. Sufficient microwave energy is applied to provide a high density, unflawed ceramic product.

19 Claims, 3 Drawing Sheets

INSULATION AND HEAT DISTRIBUTOR SET-UP FOR MICROWAVE PROCESSING OF MULTIPLE SRBSN PARTS

CROSS SECTION VIEW OF MICROWAVE INSULATION PACKAGE

TOP VIEW OF INDIVIDUAL SAMPLE LAYER(S)

COMPLEX SAMPLE

TOP VIEW OF INDIVIDUAL SAMPLE LAYER(S)

MULTIPLE SAMPLES

HEAT DISTRIBUTION CERAMIC PROCESSING METHOD

RELATED APPLICATIONS AND PATENTS

This is a continuation now abandon. of application Ser. No. 08/046.876, filed on Apr. 16. 1993.

The subject invention is related to application Ser. No. 08/046,879, now abandoned, entitled, "METHOD OF FABRICATING SINTERED REACTION BONDED SILICON NITRIDE" in the names of Terry N. Tiegs and James O. Kiggans, Jr. and U.S. patent application 07/837,096, filed Feb. 18, 1992, now U.S. Pat. No. 5,154,779.

This invention was made with government support under Contract No. DE-ACO5-840R21400 awarded by the U.S. Department of Energy to Martin Marietta Energy Systems, Inc. and the government has certain rights in this invention.

FIELD OF THE INVENTION

This invention relates to a multi-layered heat distributor system, its use in microwave heating, and the articles formed therefrom. Specifically, this invention relates to a heat distributor system and method for preparing or heat-treating ceramic articles, including but not limited to sintered reaction bonded silicon nitride (SRBSN) or, sintered silicon nitride (SSN) articles containing sintering aids, and the articles produced therefrom.

BACKGROUND OF THE INVENTION

Processing of ceramic compositions or articles, e.g., sintering, annealing, or reaction bonding, by using one or more layers of low density, low-thermal conductivity insulation is known.

Providing silicon nitride articles, as well as other ceramic articles, e.g., electronic substrates of alumina or other similar materials, multi-layered capacitors, wear parts, dies or cutting tools formed from other ceramic type materials is of great interest. Silicon nitride articles are of particular interest and belong to a class of materials that have a wide range of compositions where $Si_3N_4$ is the major phase and are especially of great interest in numerous applications due to their ability to withstand high temperatures and resist oxidation. These silicon nitride containing materials can be used in numerous applications for such diverse items as cutting tools, including inserts having various shapes and sizes, turbine and engine parts such as, rotors and stator vanes for advanced gas turbines, valves and cam roller followers for gasoline and diesel engines, and radomes on missiles to name a few. Some of these articles are of complex shape such as figurines, hubbed gears with teeth and object having variable cross-sections.

There are major differences between conventional thermal processing and microwave processing. To heat a part conventionally, i.e., thermal processing, only requires putting the part into a furnace and heating the furnace to the required temperature. If enough time is taken to permit heat to flow into the part, it must, by necessity, heat to the required temperature. Such is not the case when heating a material in a microwave furnace. Whereas heat is supplied externally to the part being processed conventionally, it is generated within the part being processed by microwaves. Depending on the dielectric properties of the part, several different phenomena may occur: (1) it may heat quickly; (2) it may not heat at all; (3) it may heat uniformly; or (4) it may generate hot spots. How the part heats depends on the dielectric loss properties of the part, how those properties change with temperature, on the microwave field distribution in the furnace and also on how the part is packaged for microwave heating.

In addition to chemical and thermal considerations, dielectric properties must be considered in microwave heating. This includes the material being processed, the insulation surrounding the part, and auxiliary materials such as thermocouples.

Uniform heating by microwave energy with the aid of a multi-layered low density insulation arrangement of the prior art has been unsuccessful because it leads to several problems. Development of an insulating system should give reproducible results and is the most difficult task in the high temperature processing of ceramics using microwaves. This is especially so when complex articles are processed.

Initially, as some articles heat-up in the presence of microwave energy, a reverse thermal gradient is generated from the inside of the part to the surface. This results in non-uniform densification and shrinkage, ultimately the article produced using low thermal conductivity insulation frequently cracks. Non-uniform heating of ceramic parts can also be a result of non-uniform microwave fields within the microwave cavity. The effect of non-uniform heating is most pronounced in articles having low thermal conductivity.

The most obvious example of these types of articles with low thermal conductivity are powdered compact samples with green densities of 45%–60%, where thermal conductivity is dictated by the porosity. Non-uniform heating of these types of samples can generate hot-spots and localize thermal run-aways. In addition, non-uniform densification, shrinkage cracking, and in some cases localized melting of the material occurs.

Previous attempts to overcome some of these problems involve the use of microwave susceptors to improve heating uniformity. These susceptors are for both internal heating within the parts or its external sources. For example, heating sources include particulates such as Al, C, SiC, TiN, TiC, $Fe_3O_4$. External sources include susceptors such as SiC rods, commonly referred to as a "picket-fence". However, the prior art use of microwave susceptors has an undesirable affect by either reducing the microwave field, and thus reducing the benefits of microwave heating, or adding an unwanted additive to the material being fabricated.

The use of one or more layers of low density, low-thermal conductivity insulation to provide uniform heating has also been attempted. For example, U.S. Pat. Nos. 5,154,799, 5,013,694, and 4,810,846 to Holcombe exemplify microwave treatment of silicon based materials with a multi-component insulation system.

Holcombe, et al. '779 teaches a method of nitriding a refractory-nitride forming material. In Holcombe, a metalloid article is heated to a temperature sufficient to react the metal or metalloid with nitrogen by applying microwave energy within a microwave oven. The Holcombe '779 process surrounds the refractory material to be treated with a ceramic aggregate of granular material. For example, a silicon powder compact was prepared and placed in a boron nitride crucible containing silicon nitride with 2 weight percent yttrium powder. An aluminum fiber board was placed around the crucible. The resulting product was converted to approximately 78% silicon nitride. However, it has been determined that when the refractory compact was completely packed in silicon nitride powder, partial melting occurred during the exothermic nitridation stage. Also, prior art processes contain "hot spots" that contribute to sample cracking.

Holcombe '694 teaches microwave heating a ceramic composite that is enclosed by an yttrium thermal insulating package. In Holcombe '846, a microwave heating container 22 includes a bottom wall 24 that can be made of boron nitride. The top wall can be made from a similar material. The side walls are composed of graphite. A casket for containing the article to be treated is located within the container that includes the boron nitride bottom wall and top wall. The casket is formed of low-thermal conductivity alumina or silica. These processes, however, do not provide satisfactory sintered articles with adequate densification.

One of the objects of the subject invention is to provide a heat distributor system that overcomes the above heating problems in the prior art microwave processes. It is another object of the subject invention to provide a method of preparing sintered reaction bonded silicon nitride articles or ceramic articles that are uniformly heated by utilizing the subject improved heat distributor system.

As a result of using the multi-layer heat distributor system of the subject invention, the problems encountered in prior thermal and microwave heating processes have been overcome, "hot spots" have been minimized, sample cracking eliminated, and overall processing times have been reduced. Consequently, the yield of defect-free parts have been increased.

Improved heat distributors in microwave processing as described in the present invention, would also aid in the uniform heating of dense materials such as in the thermal processing of ceramics, glasses and polymers. Such heat distributors would minimize the thermal gradients that are normally present during microwave heating.

SUMMARY OF THE INVENTION

In accordance with one aspect of the present invention, an improved multi-layered heat distributor system is provided. The improved heat distributor system includes a multi-layered heat package, including, an inner layer of a high thermal conductivity heat distributor (HTCHD) material with the following properties:

low absorption of microwaves or transparency to microwaves at a temperature up to about 1800° C.;

good thermal conductivity; and chemical compatibility with the article being processed.

an outer layer of insulating material, and an optional third layer of insulation layer.

In some cases the outer layers could be one material. In other cases the middle and center layers may be of different densities or composition. Cost, as well as temperature considerations will determine the system used.

In accordance with another aspect of the invention, an improved fabricating process for preparing at least one sintered reaction bonded silicon nitride article is provided. The process involves:

locating at least one silicon containing material mixed with a sintering aid in a multi-layered heat distributor system to form a package, wherein the multi-layered heat distributor system includes an inner layer of a high thermal conductivity heat distributor (HTCHD) material, a second middle layer of insulating material, and an optional third outer insulation layer and physical containment box;

placing the silicon-sintering aid composition that is surrounded by the multi-layered heat distributor system in a microwave furnace and applying microwave energy thereto.

Sufficient energy is applied so that the silicon-sintering aid composition, in the presence of nitrogen, is reacted with the nitrogen to produce silicon nitride and then the silicon nitride is sintered to form a high density sintered silicon nitride article.

In accordance with another aspect of the invention, a method of fabricating at least one ceramic article is provided where at least one ceramic composition or article is placed in a multi-layered heat distributor system to form a package and located in a microwave furnace throughout a microwave heating cycle, whereby the ceramic composition or article is exposed to microwave energy to form at least one high density sintered ceramic product.

The multi-layered heat distributor system includes an inner layer of a high thermal conductivity heat distributor (HTCHD) material, a second middle layer of insulating material that is chemically compatible, and a third, outer layer of insulation. The HTCHD inner layer includes a material that has a low absorption of microwaves or is transparent at the temperature the materials are processed at, has good thermal conductivity, and is chemically compatible with the article being processed. For example, the HTCHD material can be formed from BN, $Si_3N_4$, AlN, BeN, $SiO_3$, $Al_2O_3$ or $ZrO_2$ depending on process conditions and temperatures. The HTCHD is in the form of plates or beads or any other form known to the skilled practitioner, except for powders which have been unacceptable.

In accordance with another aspect of the invention, one or more sintered reaction bonded silicon nitride articles or sintered ceramic articles are produced using a multi-layered heat distributor system that includes an inner layer of a high thermal conductivity heat distributor (HTCHD) material that has a low absorption of microwaves or is transparent to microwave at a temperature up to about 1800° C., has good thermal conductivity, and is chemically compatible with the article being processed, a second middle layer of insulating material, and an optional third, outer layer of insulation or containment crucible.

DETAILED DESCRIPTION OF THE PREFERRED EMBODIMENT

Silicon-containing compositions for fabrication according to the subject invention are described below and are provided to facilitate the understanding of the subject invention.

EXAMPLES

Example 1

A sample of Si containing 11% by weight $La_2O_3$ and 3% by weight of $Al_2O_3$ as a sintering aid was prepared.

Example 2

A sample of Si containing 9% by weight $Y_2O_3$, 3% by weight $Al_2O_3$, and 10% by weight $Si_3N_4$ as sintering aids was prepared.

Example 3

A dense sample of $Si_3N_4$-6% $Y_2O_3$-2% $Al_2O_3$ was fabricated by well-known methods.

Comparative Example 1

A sample of Si containing 11% by weight $La_2O_3$ and, 3% by weight $Al_2O_3$ and 10% by weight $Si_3N_4$ as the sintering aids was prepared.

FABRICATING PROCESS

Figure 2:
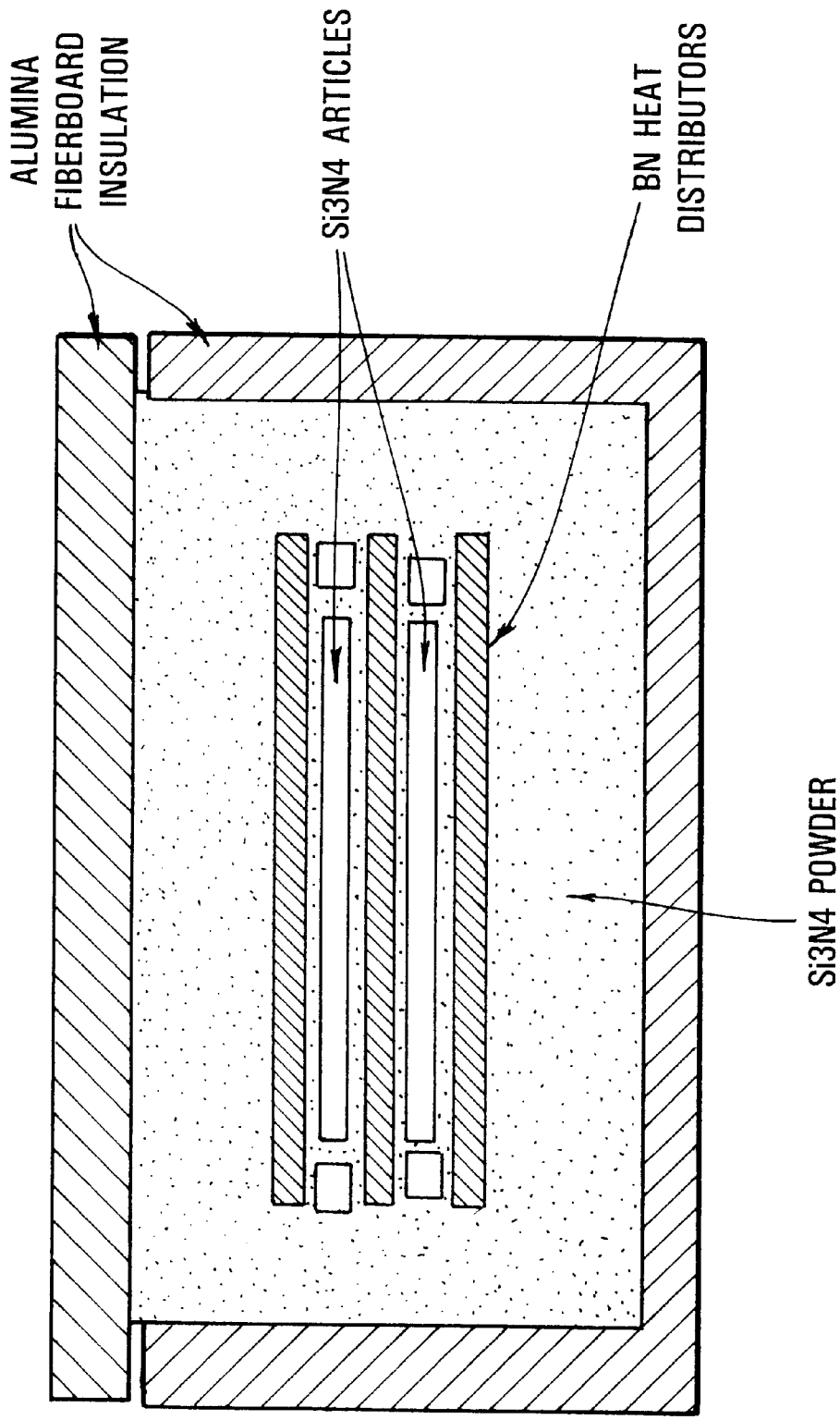
FIG. 2 shows the multi-layered system of the subject invention.

To fabricate the sintered reaction bonded silicon nitride articles of the subject invention, the composition of EXAMPLE 1, as described above, is enclosed and substantially surrounded by three layers of insulation including: (1) a first layer of dense boron nitride plates as the high thermal conductivity heat distributor (HTCHD), (2) a second middle insulation layer, and (3) a third, outer insulation layer. See FIG. 2.

The packaged compositions, e.g., EXAMPLE 1, having the multi-layered distributor of the subject invention is heated by microwave energy from 0 to about 2.5 kw with microwave energy from room temperature to a temperature of about 1450° C., in the presence of a nitrogen atmosphere for about 24 hours to nitride the Si to $Si_3N_4$. Then sufficient microwave energy is applied to maintain the package at a temperature of about 1750° C.–1800° C. for about one hour. Energy and processing times are also dependent upon the size, type and number of samples to be processed, e.g., nitrided and sintered.

Figure 1:
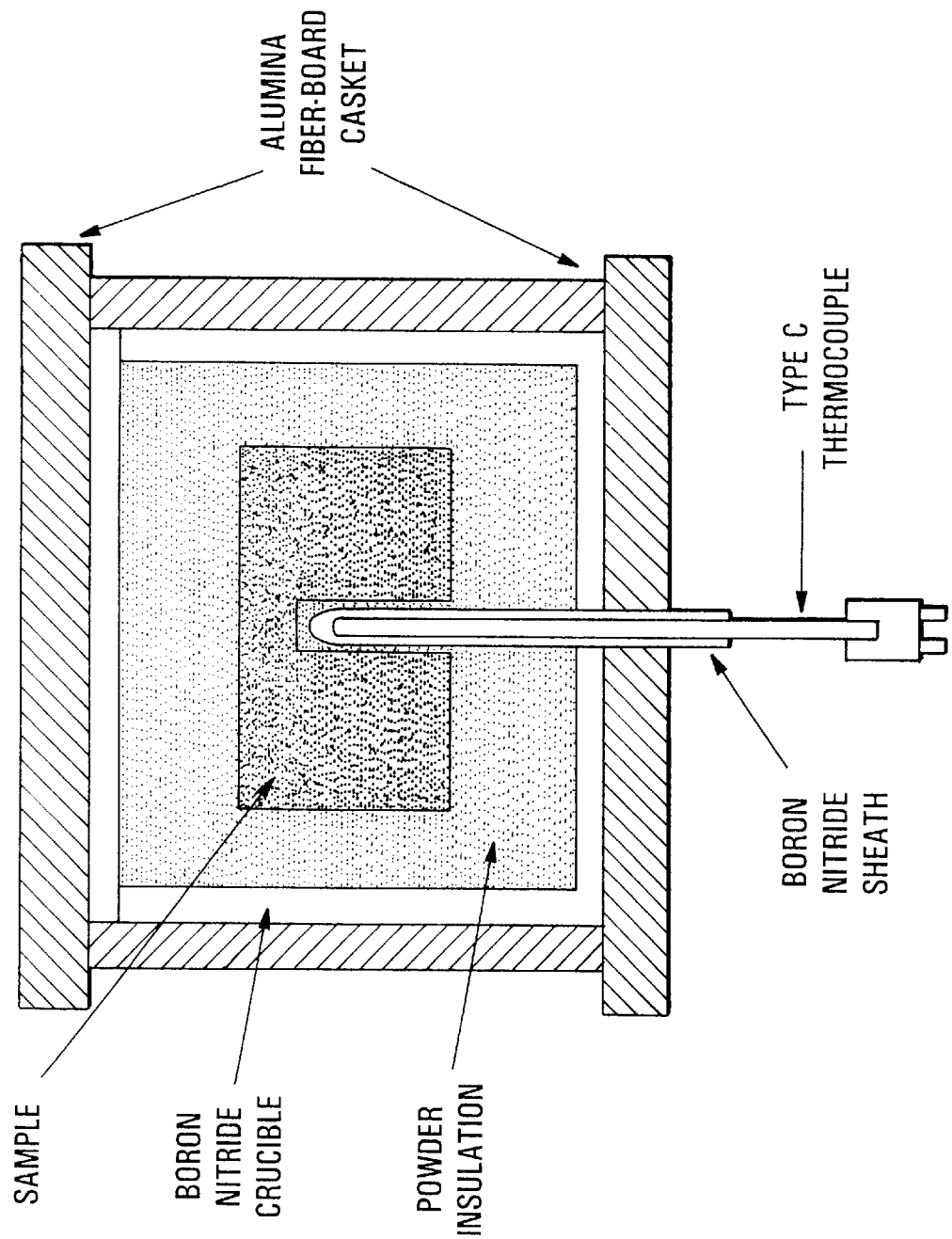
FIG. 1 shows a conventional specimen-insulating package with a thermocouple.

Comparative Example 1 is encased in a first layer of insulation power and located in a boron nitride crucible which is then surrounded by an alumina fiber-board casket. The multi-layered package containing Comparative Example 1 in a convention package, FIG. 1, is placed in a microwave furnace and processed in a manner similar to that described above for EXAMPLE 1.

The fabricated articles obtained when using the heat distributor (HTCHD) system according to the subject invention was fabricated crack-free. The samples produced without the HTCHD in comparative Example 1, many times would develop cracks in a random fashion.

Example 2 was prepared in a similar manner to Example 1 using the HTCHD. The samples were fabricated crack-free.

Example 3 was packaged in a similar manner to Example 1 using the HTCHD. The samples were heated directly to temperature of 1000° C.–1400° C. and annealed for about 10 hours. Uniform temperatures, as evidenced by no color variations, were evident.

Figure 3A:
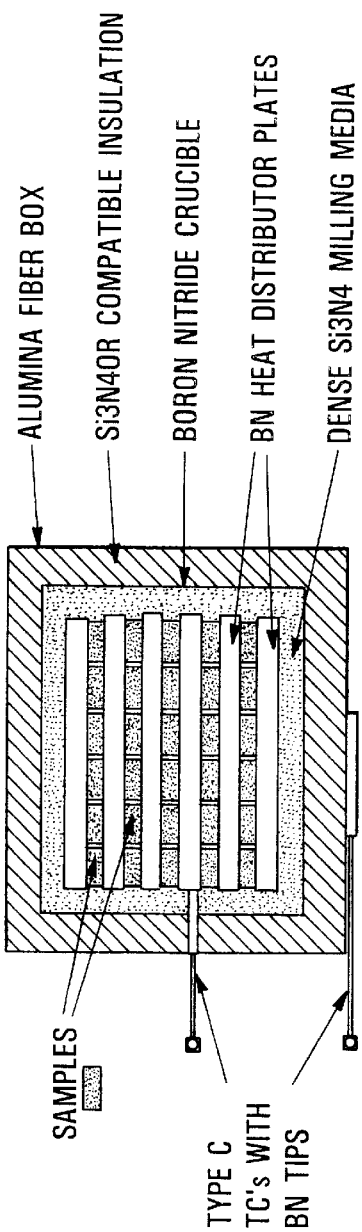
FIG. 3A shows a more detailed use of the subject invention for processing multiple parts.
Figure 3C:
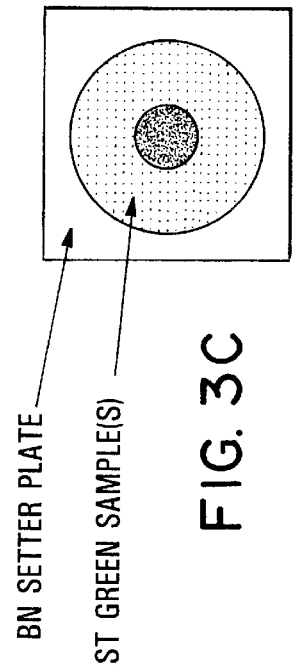
FIG. 3C is a top view of a complex sample processed according to the subject invention.
Figure 3B:
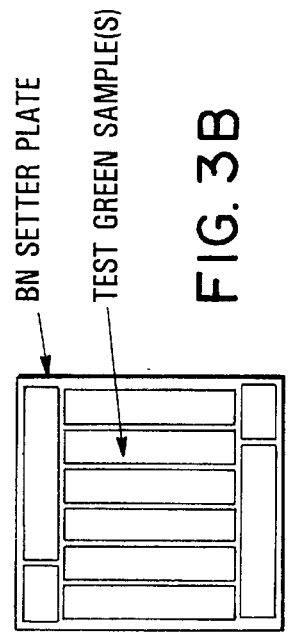
FIG. 3B shows a top view of multiple samples processed according to the subject invention.

When plural samples are processed they can be packaged as shown in FIG. 2 or FIGS. 3A through 3C. In FIG. 3A, more than two layers of samples are packaged between boron nitride plates, surrounded by dense $Si_3N_4$, a BN crucible, $Si_3N_4$ or compatible insulation and an alumina fiber box. In FIGS. 3B and 3C plural samples and a donut-shaped complex sample are respectively processed.

Although the invention has been described in conjunction with specific embodiments, it is evident that many alternatives and variations will be apparent to those skilled in the art in light of the foregoing description. Accordingly, the invention is intended to embrace all. of the alternatives and variations that fall within the spirit and scope of the appended claims.

What is claimed is:

1. A method of manufacturing a ceramic article, comprising the steps of:
    juxtaposing a ceramic compact and a high thermal conductivity heat distributor which is substantially transparent to microwave energy;
    placing the juxtaposed heat distributor and ceramic compact in an insulative container filled with insulative powder which surrounds the juxtaposed heat distributor and ceramic compact, thereby forming a package;
    heating the ceramic compact by interaction of the ceramic compact with microwave energy, whereby hot spots forming in the ceramic compact are conducted and thermally diffused by the heat distributor.

2. A method according to claim 1, wherein the ceramic compact is made of silicon and a sintering aid, and the method further comprising exposing the package to nitrogen and converting the ceramic compact to silicon nitride by application of microwave-generated heat.

3. A method according to claim 2, wherein the sintering aid comprises about 11% by weight $La_2O_3$ and 3% by weight $Al_2O_3$.

4. A method according to claim 2, wherein the sintering aid comprises about 9% by weight $Y_2O_3$ and 3% by weight $Al_2O_3$.

5. A method according to claim 1, wherein the heat distributor is made of boron nitride.

6. A method according to claim 1, wherein the heat distributor is made of a material selected from the group consisting of $Si_3N_4$, AlN, BeN and $SiO_2$.

7. A method according to claim 1, wherein the heat distributor is made of a material selected from the group consisting of $Al_2O_3$ and $ZrO_2$.

8. A method according to claim 2, further comprising exposing the ceramic compact to microwave energy at a level sufficient to heat the ceramic compact to a temperature of about 1750° C. to thereby convert the silicon to silicon nitride, and maintaining the temperature at about 1750° C. to sinter the ceramic compact.

9. A method according to claim 1, wherein the insulative powder is made of $Si_3N_4$.

10. A method of manufacturing a ceramic article, comprising the steps of:
    juxtaposing in alternating positions a plurality of ceramic compacts and a plurality of high thermal conductivity heat distributors, each heat distributor being substantially transparent to microwave energy;
    placing the juxtaposed heat distributors and ceramic compacts in an insulative powder which surrounds the juxtaposed heat distributors and ceramic compacts thereby forming a package;
    heating the ceramic compacts by interaction of the ceramic compacts with microwave energy, whereby hot spots forming in the ceramic compacts are conducted and thermally diffused by the heat distributors.

11. A method according to claim 10, wherein the ceramic compacts are made of silicon and a sintering aid, and the method further comprising exposing the package to nitrogen and converting the ceramic compacts to silicon nitride by application of microwave-generated heat.

12. A method according to claim 11, wherein the sintering aid comprises about 11% by weight $La_2O_3$ and 3% by weight $Al_2O_3$.

13. A method according to claim 11, wherein the sintering aid comprises about 9% by weight $Y_2O_3$ and 3% by weight $Al_2O_3$.

14. A method according to claim 10, wherein the heat distributor is made of boron nitride.

15. A method according to claim 10, wherein the heat distributors are made of a material selected from the group consisting of $Si_3N_4$, AlN, BeN and $SiO_2$.

16. A method according to claim 10, wherein the heat distributors are made of a material selected from the group consisting of $Al_2O_3$ and $ZrO_2$.

17. A method according to claim 11, further comprising exposing the ceramic compacts to microwave energy at a level sufficient to heat the ceramic compacts to a temperature of about 1750° C. to thereby convert the silicon to silicon nitride, and maintaining the temperature at about 1750° C. to sinter the ceramic compacts.

18. A method according to claim 10, wherein the insulative powder is made of $Si_3N_4$.

19. A method of manufacturing a ceramic article, comprising the steps of:

juxtaposing a ceramic compact and high thermal conductivity beaded heat distributors which are substantially transparent to microwave energy;

placing the juxtaposed beaded heat distributors and ceramic compact in an insulative container filled with insulative powder which surrounds the juxtaposed beaded heat distributors and ceramic compact, thereby forming a package;

heating the ceramic compact by interaction of the ceramic compact with microwave energy, whereby hot spots forming in the ceramic compact are conducted and thermally diffused by the beaded head distributors.

\* \* \* \* \*